United States Patent
Pal et al.

(10) Patent No.: US 10,984,186 B2
(45) Date of Patent: Apr. 20, 2021

(54) SMART ELECTRONIC MAIL AND MESSAGING TEMPLATES

(71) Applicant: Microsoft Technology Licensing, LLC, Redmond, WA (US)

(72) Inventors: Manjot Singh Pal, Seattle, WA (US); Thomas Coolidge Stanton, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/664,717

(22) Filed: Jul. 31, 2017

(65) Prior Publication Data

US 2019/0034403 A1    Jan. 31, 2019

(51) Int. Cl.
*G06F 17/00* (2019.01)
*G06F 40/186* (2020.01)
*H04L 12/58* (2006.01)
*G06Q 10/10* (2012.01)
*G06F 40/174* (2020.01)
(Continued)

(52) U.S. Cl.
CPC .......... *G06F 40/186* (2020.01); *G06F 40/174* (2020.01); *G06F 40/194* (2020.01); *G06Q 10/10* (2013.01); *G06Q 10/107* (2013.01); *H04L 51/02* (2013.01); *H04L 51/063* (2013.01); *H04L 51/32* (2013.01); *G06F 3/0482* (2013.01); *G06F 16/245* (2019.01); *G06Q 50/01* (2013.01); *H04L 51/04* (2013.01)

(58) Field of Classification Search
None
See application file for complete search history.

(56) References Cited

U.S. PATENT DOCUMENTS 7,260,773 B2 * 8/2007 Zernik ................ G06F 17/2211
707/999.202
7,552,185 B1 6/2009 Kirzner et al.
(Continued)

OTHER PUBLICATIONS

"Outook Template Auto Fill in Email Recipient Name", https://www.experts-exchange.com/questions/21927624/Outook-Template-auto-fill-in-email-recipient-name.html, Published on: Jul. 21, 2006, 7 pages.
(Continued)

*Primary Examiner* — Mustafa A Amin
(74) *Attorney, Agent, or Firm* — Merchant & Gould P.C.

(57) ABSTRACT

Automatic generation of electronic messaging templates is provided. After a first email/message is generated and used, a second or a plurality of subsequent messages may be compared against the first or other similar emails/messages. Common elements among the similar emails/messages and elements not in common in the compared emails/messages are identified. An email/message template is automatically generated having textual content comprising all elements (e.g., text) common to each compared email/message and having highlighting components, such as an "XXX" or other acceptable highlighting notation at a location in the textual content corresponding to each uncommon element. Upon subsequent use, when a sender opens the template and enters any information particular to the intended recipient, that information may be used to query a database or other data source for information that may be used to automatically fill-in (autofill) each highlighted uncommon element in the template.

20 Claims, 9 Drawing Sheets

(51) Int. Cl.
*G06F 40/194* (2020.01)
*G06Q 50/00* (2012.01)
*G06F 3/0482* (2013.01)
*G06F 16/245* (2019.01)

(56) References Cited

U.S. PATENT DOCUMENTS

| | | | |
|---|---|---|---|
| 8,661,342 | B2 | 2/2014 | Lu et al. |
| 8,886,735 | B1* | 11/2014 | Liu ................... G06Q 10/107 709/206 |
| 2003/0233408 | A1 | 12/2003 | Goodman |
| 2008/0155025 | A1 | 6/2008 | Xu et al. |
| 2009/0144357 | A1 | 6/2009 | Cope et al. |
| 2009/0157827 | A1 | 6/2009 | Bangalore |
| 2014/0032683 | A1* | 1/2014 | Maheshwari ......... H04L 51/063 709/206 |
| 2014/0120961 | A1* | 5/2014 | Buck ...................... H04W 4/12 455/466 |
| 2016/0087925 | A1* | 3/2016 | Kalavagattu ......... H04L 51/066 709/206 |
| 2016/0171093 | A1* | 6/2016 | Benati ................... G06F 40/205 707/755 |

OTHER PUBLICATIONS

David, Christina, "Email Templates: Send Templated Emails to Your Contacts",https://help.nutshell.com/nutshell-key-features-and-capabilities-explained/email-marketing/email-templates-send-templated-emails-to-your-contacts, Mar. 28, 2017, 5 pages.

"Personalized Email Messages", https://jangomail.com/personalized-email-messages/, Published on: 2000, 2 pages.

"International Search Report and Written Opinion Issued in PCT Application No. PCT/US2018/034974", dated Jul. 30, 2018, 11 Pages.

\* cited by examiner

SMART ELECTRONIC MAIL AND MESSAGING TEMPLATES

BACKGROUND

In a typical business, educational, or social setting, users often find a need to send very similar electronic mail items or other electronic messaging items to tens, hundreds, or even thousands of recipients where only minor changes are made to each email/message item before it is sent. For example, a business may send a nearly identical electronic mail item to hundreds of customers enclosing an invoice for services where the only difference in the hundreds of mail items is the name to which each item is addressed and one or more other items such as an invoice number, price, due date, and the like. Similarly, a teacher may send a very similar email to parents of fifty students reminding the parents of an upcoming parent/teacher conference where the only difference in the fifty email messages is the name to which each message is addressed and a date/time of the upcoming conference.

In a typical case, for each successive email/message, senders copy a previously sent message and then manually change information that is not common to all messages, for example, recipient name, invoice number, invoice amount, date/time of a particular meeting, and the like. However, such senders often forget to change a given item from a previous message, and erroneous information is sent to a recipient that may embarrass the sender and/or make the sender appear unprofessional. In addition, sensitive information such as financial data particular to a given recipient may be sent to the wrong recipient. In addition to the social and security issues caused by such situations, manually creating each successive message is time-consuming and results in significant computational waste where the sender must create each message manually, including searching one or more data sources for information particular to each message.

It is with respect to these and other considerations that the present invention has been made.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects of the present disclosure are directed to methods, systems and computer readable storage devices for automatically generating electronic email/messaging templates that may be subsequently automatically populated with data particular to given recipients. According to an aspect, after a first email/message is generated and used, a second or a plurality of subsequent messages may be compared against the first or other similar emails/messages. During the comparison process, common elements among the similar emails/messages are identified, for example, common transmittal language. Next, elements not in common in the compared emails/messages are identified, for example, particular recipient names, particular invoice numbers, particular meeting dates/times, and the like.

An email/message template is automatically generated having textual content comprising all elements (e.g., text) common to each compared email/message and having highlighting components, such as an "XXX" or other acceptable highlighting notation at a location in the textual content corresponding to each uncommon element.

Upon subsequent use, when a sender opens the template and enters any information particular to the intended recipient, that information may be used to query a database or other data source for information that may be used to automatically fill-in (autofill) each highlighted uncommon element in the template. Such information may then be automatically populated into the highlighted fields of the template to personalize the template for the intended recipient. As should be appreciated, the sender of the email/message may also manually input data into any or all of the highlighted fields, as desired.

Examples are implemented as a computer process, a computing system, or as an article of manufacture such as a device, computer program product, or computer readable medium. According to an aspect, the computer program product is a computer storage medium readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
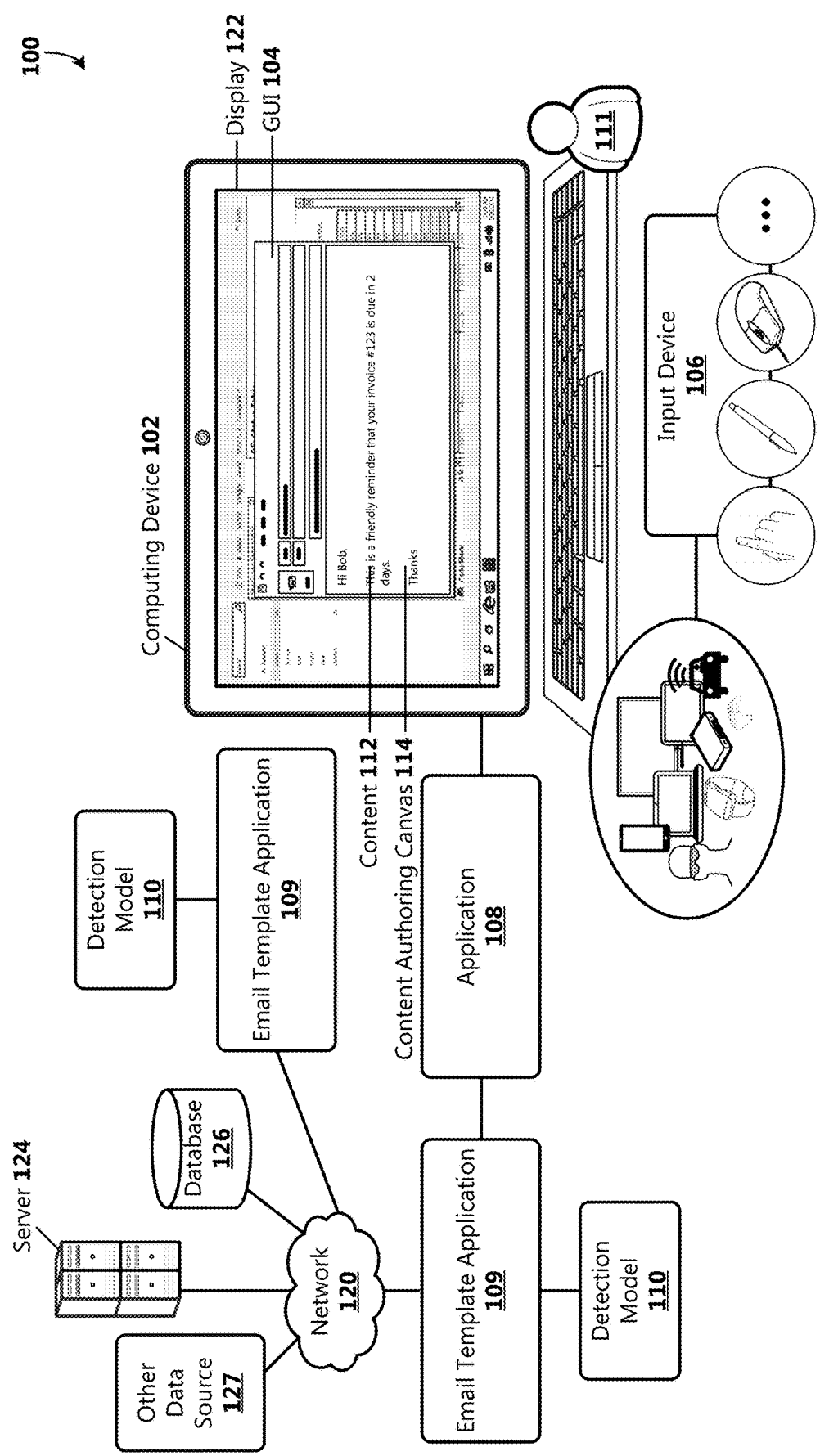
FIG. 1 is a block diagram showing an example operating environment for implementation of the present disclosure.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

As briefly described above, aspects of the present disclosure are directed to automatically generating electronic email/messaging templates that may be subsequently automatically populated with data particular to given recipients where each electronic email/message includes one or more elements in common with other similar emails/messages and includes one or more elements not in common with other similar email/messages. According to an aspect, after a first email/message is generated and used, a second or a plurality of subsequent messages may be compared against the first or other similar emails/messages. During the comparison process, common elements among the similar emails/messages are identified, for example, common transmittal language. Next, elements not in common in the compared emails/messages are identified, for example, particular recipient names, particular invoice numbers, particular meeting dates/times, and the like. According to one aspect, identification of uncommon elements may be performed by finding in the text of the compared emails/messages words, numbers, phrases, and the like that do not match similarly positioned words, numbers, phrases in the compared-to emails/messages.

In addition, natural language processing and modeling may be performed on the compared emails/messages for finding text patterns, synonymous phrasing, and user intent. For example, such analysis may determine that the next word after a salutation word or phrase such as "Dear," "Hi," "Hello," "Hey," or the like is a name. Similar analysis may be performed to determine that the next content after a phrase like "invoice number" is a numeric string. As should be appreciated, these are but a few examples of words or phrasing that may be used for determining that content following such words or phrases is an item that is uncommon in each of the compared emails/messages.

After the foregoing comparison and determinations are made, an electronic messaging (e.g., email/message) template is automatically generated having textual content comprising all elements (e.g., text) common to each compared email/message and having highlighting components, such as an "XXX" at a location in the textual content corresponding to each uncommon element. The template may then be stored for subsequent use.

Upon subsequent use, when a sender opens the electronic messaging template and enters any information particular to the intended recipient, for example, a name, electronic mail address, text messaging number/address, or the like, that information may be used to query a database or other data source for information that may be used to automatically fill-in (autofill) each highlighted uncommon element in the template. For example, for emails/messages reminding an intended recipient of an invoice, once the recipient's email address is entered, the email address may be used to automatically query a data source for the recipient's first and/or last name, the invoice number, the invoice amount, a due date for payment, and the like. Such information may then be automatically populated into the highlighted fields of the template to personalize the template for the intended recipient. As should be appreciated, the sender of the email/message may also manually input data into any or all of the highlighted fields, as desired. If the system fails to autofill a given highlighted field, where information is not available or where there is an ambiguity, or if the sender fails to populate a given field, a notification may be presented to remind the sender to complete the field before transmission of the email/message generated from the template.

Advantageously, the disclosed aspects enable the benefit of technical effects that include, but are not limited to, increased computational efficiency and reductions in bandwidth while providing an improved user experience by providing electronic messaging templates, as described herein. For example, using aspects of the present disclosure, a user is not required to open a previous message followed by searching one or more data sources for information needed to manually fill items that are different from the previous message presently in use. Such a process is computationally inefficient and leads to errors and inconsistencies, and thus, aspects of the present disclosure reduce additional processing and bandwidth usage associated with avoidable searches and error correction associated with manual creation of electronic messages.

With reference now to FIG. 1, a block diagram of an example operating environment 100 illustrating aspects of an example system for providing automatic generation of electronic messaging templates is shown. The example operating environment 100 includes an electronic computing device 102. The computing device 102 illustrated in FIG. 1 is illustrated as a laptop computing device; however, as should be appreciated, the computing device 102 may be one of various types of computing devices (e.g., a tablet computing device, a desktop computer, a mobile communication device, a laptop/tablet hybrid computing device, a large screen multi-touch display, a gaming device, a smart television, a wearable device, or other type of computing device) for executing applications 108 for performing a variety of tasks. The hardware of these computing devices is discussed in greater detail in regard to FIGS. 8, 9A, 9B, and 10.

A user 111 may use an application 108 on the computing device 102 for a variety of tasks, which may include, for example, to write, calculate, draw, take and organize notes, organize and prepare presentations, send and receive electronic mail, make music, and the like. Examples of suitable applications 108 include, but are not limited to, word processing applications, spreadsheet applications, slide presentation applications, electronic mail applications, drawing applications, note-taking applications, web browser applications, and game applications. Applications 108 may include thick client applications 108, which are stored locally on the computing device 102, or may include thin client applications 108 (i.e., web applications) that reside on a remote server and are accessible over a network. A thin client application 108 may be hosted in a browser-controlled environment or coded in a browser-supported language and may be reliant on a common web browser to render the application 108 executable on the computing device 102.

According to examples, the application 108 is a program that is launched and manipulated by an operating system, and manages content 112 within a content authoring canvas 114 and published on a display screen 122. Aspects of the application(s) 108 are operative to generate and provide a graphical user interface (GUI) 104 that allows a user 110 to interact with application functionality and electronic content. In various examples, the GUI 104 includes a toolbar, comprising various tools and settings related to authoring the content, and a content region display area, in which the content authoring canvas 114 of a document content file is displayed.

In examples, the application 108 receives input from the user 111, such as text input, drawing input, inking input, etc., via various input devices 106 and methods, such as those relying on mice, keyboards, and remote controls, as well as Natural User Interface (NUI) methods, which enable a user to interact with a device in a "natural" manner, such as via speech recognition, touch and stylus recognition, gesture recognition both on screen and adjacent to the screen, air gestures, head and eye tracking, voice and speech, vision, touch, hover, gestures, and machine intelligence. The user input results in content 112 being added to the content authoring canvas 114. Examples of a content authoring canvas include a page in a document content file, a spreadsheet in a spreadsheet content file, a slide in a presentation content file, a page in a notes content file, etc.

According to an aspect, the application 108 is an electronic mail application, text messaging application, instant messaging application or other electronic messaging application operative or configured to generate, modify, send and receive electronic mail and/other electronic messages as described herein. The application 108 may operate as a standalone client-side application, or system or the application 108 may communicate with a messaging service at a server 124 over the network 120, as illustrated in FIG. 1. Data generated, sent, and received by the application 108 may be stored locally on the computing device 102 or at one or more data sources 126, 127.

Referring still to FIG. 1, the email template application 109 is illustrative of a software application, module, firmware module, or device having computer executable instructions operative or configured to automatically generate and enable autofill of electronic mail/electronic messaging templates, as described herein. As briefly described above, and as described further below with reference to FIGS. 2-7, the electronic template application 109 generates email/messaging templates by comparing a plurality of similar emails/messages and by automatically generating a template having one or more common elements from the compared emails/messages and one or more highlighted uncommon elements that are particular to a given email/message and that may be manually or automatically populated by a subsequent user for generating a personalized email/message for an intended recipient.

The detection model 110 is illustrative of a software application, module or device having sufficient computer executable instructions for use in analyzing text or other content 112 contained in a email/message for determining patterns in the content 112 and for determining elements that are common between two or more emails/messages and for determining elements that are not common between different messages. For example, if a first message includes a text string of "Dear Bob, Enclosed is invoice #123 in the amount of $46.00" and a second message contains the text "Dear Sarah, Enclosed is invoice #456 in the amount of $65.00," the detection model 110 may be used for analyzing the two text strings contained in two similar electronic email/message items for determining common elements, uncommon elements, and patterns. For example, common elements such as "Dear" and "Enclosed is invoice," may be determined by the model as being contained in both electronic mail/messages. On the other hand, elements containing particular names, invoice numbers, amounts, dates, or any other information items that are not common between the two electronic mail/messages may be determined by the model 110 as being uncommon between the two emails/messages.

In addition, the model 110 may be used for determining patterns. For example, patterns may be determined where a word such as "Dear," "Hi," "Hello," or "Hey," may be determined as always preceding a name. Other patterns, for example, where a numeric text string always follows a word or phrase such as "invoice number" may be used for determining certain patterns within the text or content 112.

It should be appreciated that the use of natural language processing and modeling for detecting such patterns in textual content and for comparing textual content to determine common words or phrases between two documents as opposed to uncommon words or phrases between two documents is well-known to those skilled in the art and may be used for determining common elements, uncommon elements and content patterns according to the present disclosure.

As illustrated in FIG. 1, the email template application 109 and the detection model 110 are illustrated on the client side of the system 100 in association with the application 108. In addition, the email template application 109 and the detection model 110 are also illustrated on the server side accessible by the client side via the network 120. Thus, according to aspects of the present disclosure, the email template application 109 and the detection model 110 may operate on the client side as stand-alone applications/modules/devices, or the email template application 109 and model 110 may operate as components of the application 108 so that the functionality described herein may be operated as a client side function in association with the application 108. Alternatively, the email template application 109 and detection model 110 may operate as a server side function or service accessible by the application 108 via the network 120, as illustrated in FIG. 1. In addition, the server side electronic mail template application 109 and detection model 110 may operate as a stand-alone software application/module/device, or may be operated as components of the server 124, illustrated in FIG. 1.

Referring still to FIG. 1, the database 126 and the other data sources 127 are illustrative of data that may be accessed by the email template application 109 and detection model 110 for generating the email/message templates, described herein, and for auto filling uncommon elements fields in generated templates when the templates are being used to create personalized emails/messages, as described herein. For example, during the process of generating an email/message template, the email template application 109 and detection model 110 may query the database 126 or other data sources 127 for one or more other emails/messages for assisting the model 110 and the email template application 109 in determining common elements that will be placed in the template versus uncommon elements that will be highlighted for subsequent manual or auto fill.

For example, upon receipt of a given electronic mail message, the email template application 109 and detection model 110 may query the data sources 126, 127 for similar electronic mail/messages for beginning the process of generating an email/message template. For example, upon receipt of a given email or text message, textual content from the message may be extracted and used in a query to one of the data sources 126, 127 for finding previous emails/messages containing the same or similar content. For example, if the received electronic mail message is an invoice reminder, having language such as "Enclosed is invoice #123," that language may be used by the email template application 109 and/or model 110 for querying the data sources 126, 127 for finding other electronic mail messages sent by the same sender organization/enterprise to begin the comparison of the newly-received electronic mail message against previously used electronic mail messages so that a template may be generated containing common textual elements and highlighted uncommon elements, as described herein.

In addition, the data sources 126, 127 may be subsequently used for obtaining information for automatically filling highlighted uncommon elements in a generated email/message template. For example, as described further below with reference to FIGS. 2-7, if an electronic mail or text message template is generated, upon subsequent use of the generated email/message, any identifiable information entered by a user 111, for example, an electronic mail address, text messaging number, name, or any other information entered by the sender, may be used to query the data sources 126, 127 for information that may be used to automatically fill the template being used by the sender. For example, continuing with the invoice reminder example discussed above, once the sender enters an electronic mail address into the template, the electronic mail address may be used to query an enterprise database 126, or another data source 127 for finding a first, middle, and/or last name associated with the electronic mail address, an invoice number, an invoice due date, an invoice amount, and the like associated with the entered electronic mail address that may then be used to automatically fill those elements in the template.

As should be appreciated, the data sources 126, 127 may take a number of different forms. For example, the database 126 may be an enterprise level database containing profile information for employees of a large enterprise. Thus, when queried with a piece of information entered by a user 111 into a generated template, that information may be used to query the database for obtaining other information from the user profile, for example, full name, address, telephone number, financial information, and the like. Other data sources 127 may take other forms, for example, databases containing financial information associated with financial applications and the like. For example, a company may use a popular software application such as QUICKBOOKS® (available from Intuit, Inc., of Mountain View, Calif.) for generating invoices and for handling the company's accounting. Thus, when a user 111 of an automatically generated template enters a piece of information, such as an electronic mail address, a company name in a subject line of the mail/message, or the like, such entered information may be used to query the data source 127 to obtain other information such as invoice numbers, due dates, prices, and the like for automatically populating the template in use.

As should be appreciated, the foregoing are but a few examples of queries that may be used for obtaining information for automatically filling an automatically generated template. For example, if a teacher is generating an electronic mail message to fifty parents to set up parent teacher conferences, upon entry of a given parent's electronic mail address, that information may be used to query a database 136 or data source 127 for obtaining the parent's name, the student's name, the date/time of the parent/teacher conference, etc.

Figure 2:
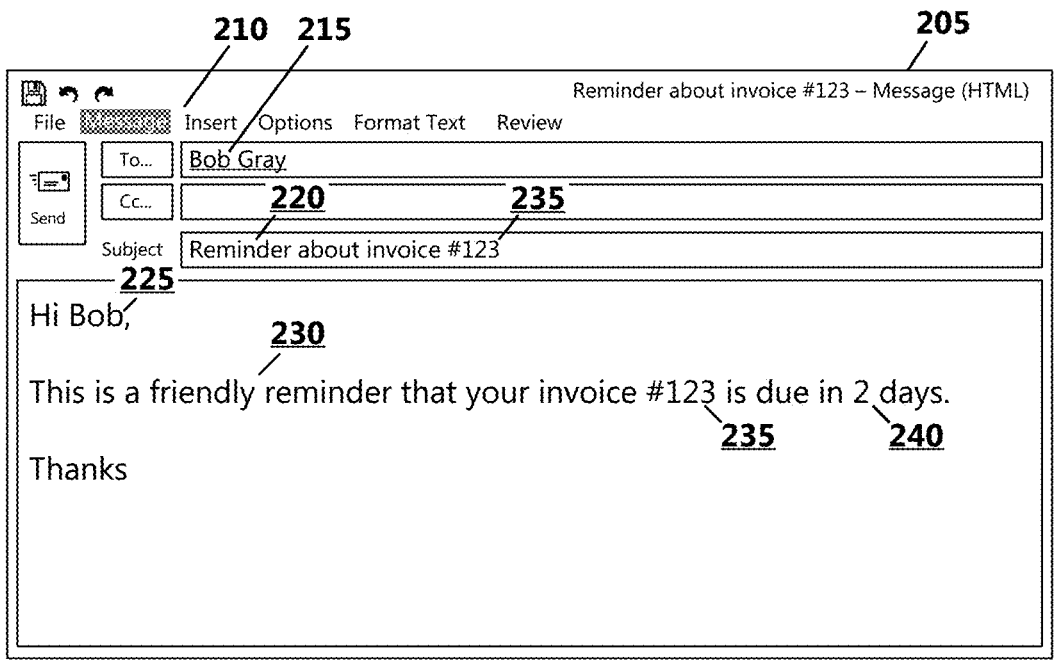
FIGS. 2-6 illustrate example electronic mail user interfaces showing the generation and population of electronic email/messaging templates according to aspects of the present disclosure.

Referring now to FIGS. 2-6, example electronic messaging user interfaces are illustrated showing received electronic messages, generated electronic messaging templates, and used electronic messaging templates according to aspects of the present disclosure. Referring to FIG. 2, an electronic mail message user interface 205 is illustrated, showing electronic mail application functionality buttons and controls 210. In the illustrated electronic mail application user interface, an addressee 215 "Bob Gray" illustrated in the "To" field. A subject text 220 of "Reminder about invoice #123" is illustrated in the subject field. Textual content is illustrated containing the phrase "Hi Bob, This is a friendly reminder that your invoice #123 is due in 2 days. Thanks."

As illustrated, the textual content has a number of components including a particular name 225, and textual components 230, 235, 240. As will be appreciated, and as described further below, in the text string "This is a friendly reminder that your invoice #123 is due in 2 days," some of the elements of the text string may be found to be common elements with other similar email messages' text strings and some elements may be found to be uncommon. For example, the string "This is a friendly reminder that your invoice" may be a common text string that may be used in any electronic mail message sent by the sender to a person or entity to which an invoice reminder is desired. On the other hand, the string 235 "#123" and the string 240 "2" may be determined to be uncommon elements with a subsequently compared-with electronic mail message string because those elements are particular to this recipient's invoice and due date.

Figure 3:
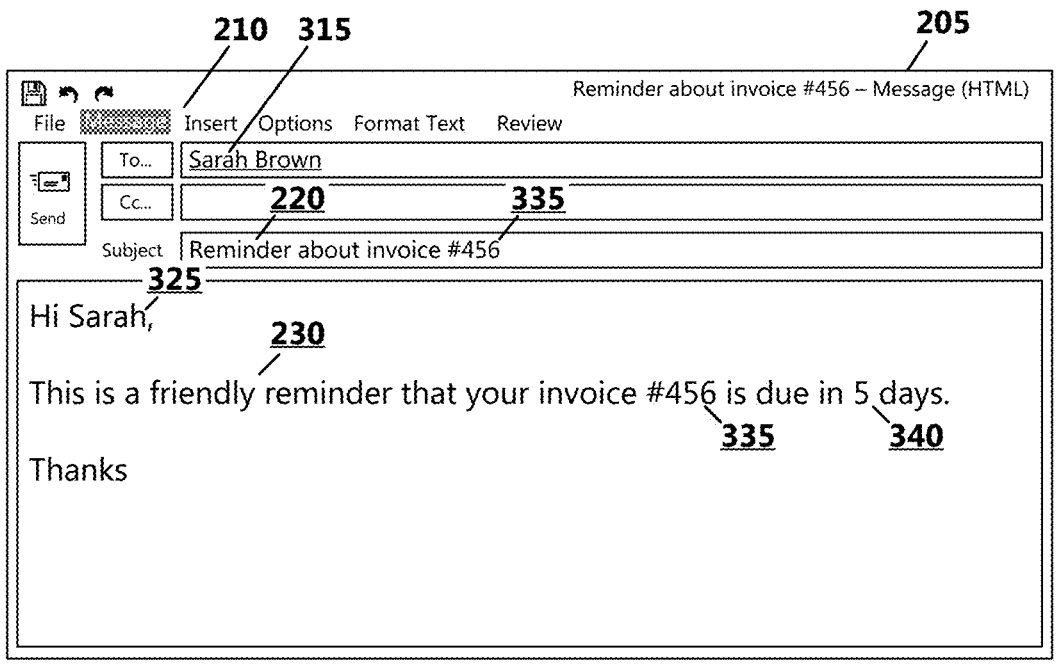

Referring to FIG. 3, a different recipient 315 of "Sarah Brown" is illustrated. In this case, this recipient's invoice number 335 is "#456" and her invoice due date 340 is "5." Thus, in comparing the two sample electronic mail messages, illustrated in FIGS. 2 and 3, a number of textual components such as the text string 220 found in the subject lines and the text string 230 found in the body of the electronic mail messages are common between the two messages. On the other hand, strings particular to each individual electronic mail message, for example, recipient names, invoice numbers, and due dates are uncommon elements between the two messages and those text strings likely will be different in any two electronic mail messages prepared by the sender.

Figure 4:
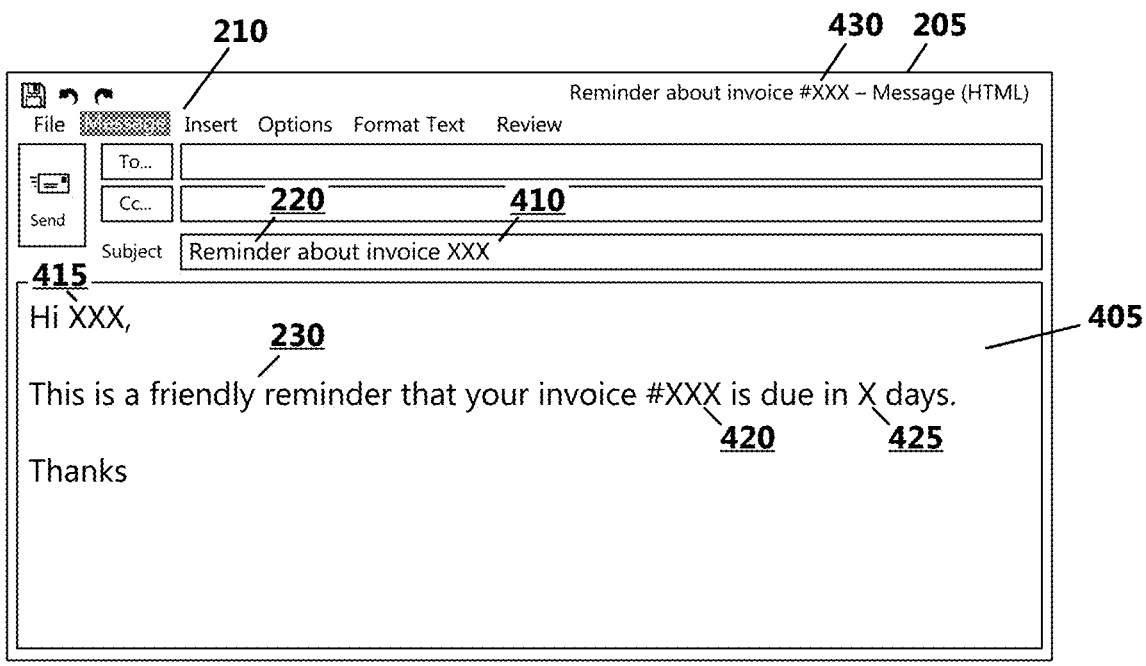

Referring now to FIG. 4, in accordance with aspects of the present disclosure, after the two electronic mail messages illustrated in FIGS. 2 and 3 are compared and analyzed by the email templates application 109 and the detection model 110, as described above with reference to FIG. 1, a template 405 is generated and is presented in the electronic mail application user interface 205. As illustrated, the common elements 220 and 230 are automatically populated in the template 405, and the uncommon elements detected from the original electronic mail messages, as illustrated in FIGS. 2 and 3, have been replaced with highlighting such as "XXX" 410, 420, 425, 430 showing areas that need to be populated for personalizing the template 405 for an intended recipient. As should be appreciated, the highlighting of "XXX" is for purposes of example only and is not limiting of a variety of ways in which the uncommon elements may be highlighted, for example, inclusion of an underlined space, a text box, a colored highlighting region, and the like to indicate an area in which information must be automatically or manually filled in.

Figure 5:
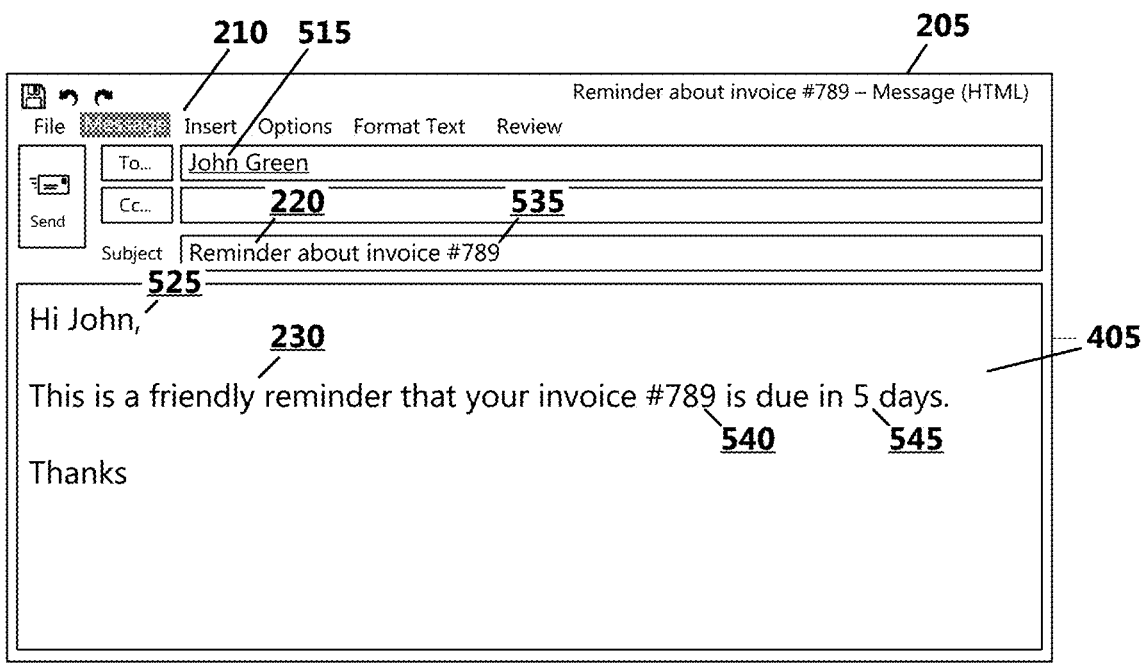

Referring now to FIG. 5, use of the template 405 for generating and automatically populating an electronic mail message to an intended recipient is illustrated. According to one aspect, the user may simply fill-in/replace each highlighted area "XXX" with desired information, for example, the recipient's name, the recipient's invoice number, the number of days in which the invoice will become due, and the like. Alternatively, when the user enters any piece of identifiable information, for example, the recipient's electronic mail address 515, for example, "John Green," the email templates application 109 may form a query with that received information and pass that query to a data source 126, 127 for obtaining profile information for the identified person or entity.

For example, as illustrated in FIG. 5, querying the data sources 126, 127 with the email address "John Green,"

allows the application 109 to find the recipient's first name 525 "John," the recipient's invoice number 540 "#789," and the recipient's due date 545 "6." As should be appreciated, the query using the received email address may have been sent to an enterprise database 126 at which the required information is maintained. Alternatively, another data source 127 may be used that is particular to the information required for this electronic mail message. For example, if the sending entity uses an accounting and financial software package, for example, the aforementioned QUICK-BOOKS® by Intuit Inc., then a data source 127 at which the sending entity's financial data are maintained, including such information as invoice number, invoice dates, invoice amounts, and the like may queried with the received information, in this case, an electronic mail address.

As should be appreciated, other information may be used for querying the data sources 126, 127. For example, if instead of entering an electronic mail address, the user 111 knows and enters a particular invoice number, then the received invoice number may similarly be used for querying the data sources 126, 127 for returning other information needed for automatically filling the generated template 405. Indeed, any information entered by a sending user 111 may be used to query a data source 126, 127 to access information associated with the entered information that may be used to automatically fill/populate uncommon element fields in the generated electronic messaging template.

Figure 6:
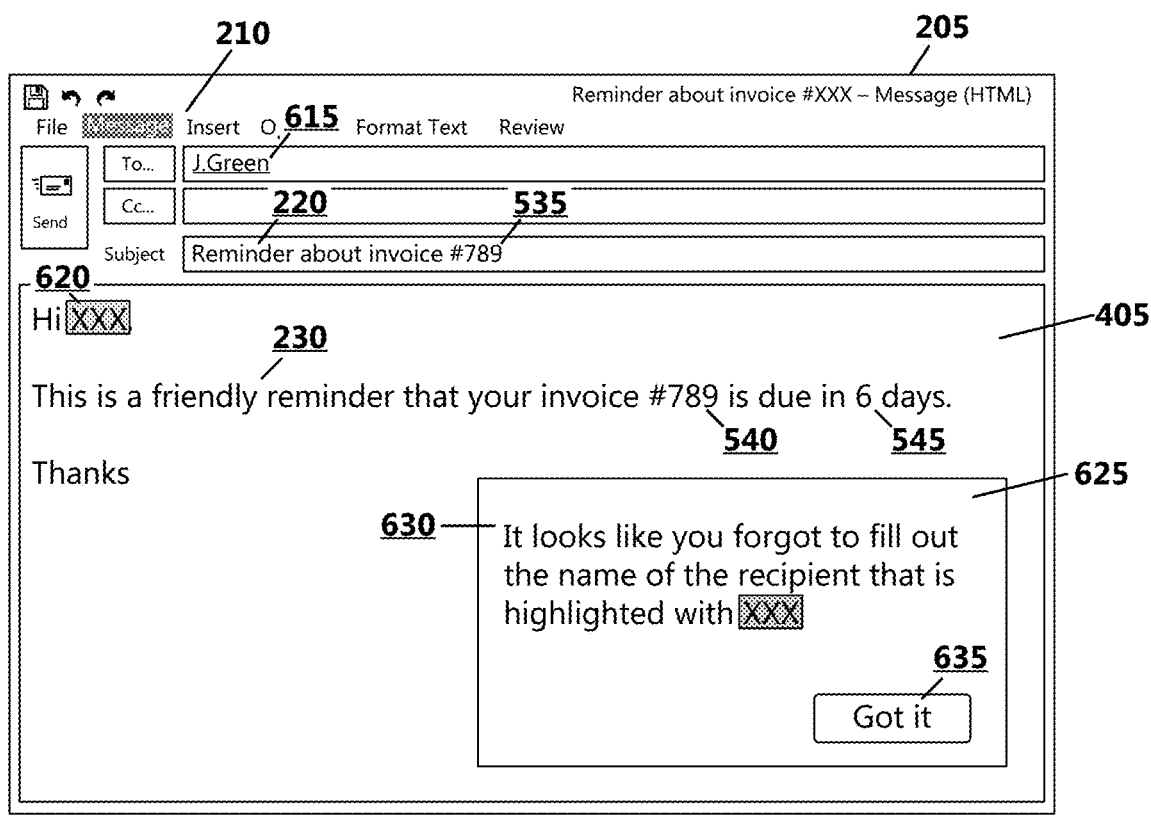

Referring now to FIG. 6, the automatically generated template 405 described in FIG. 5 is illustrated wherein the sending user 111 enters a different type of information, in this case, a different electronic mail address 615 "J. Green." According to this example, when the entered information is used as a query to the data sources 126, 127, information is returned to auto populate the template 405, but the recipient's first name is not returned, and thus, the highlighting 620 for the recipient's name is not auto populated. As should be appreciated, the data sources 126, 127 may not have the recipient's first name, or an ambiguity may exist where a first and middle name are stored for the intended recipient, and the system cannot properly distinguish which name to return for auto populating the name in the electronic mail text. Thus, in such a case, the user 111 may be required to manually complete any field that has not been auto populated, as described above.

As should be appreciated, ambiguities in queried data may exist, where information entered by the sending user 111 locates conflicting data in the data sources 126, 127. For example, the email address "J. Green" may locate a duplicate data record in the data source 126, 127 to the data record found and used as illustrated in FIG. 5, and as a result, the email template application 109 may not be able to determine, with confidence, information that should be returned for auto population. For another example, if a sending user 111 enters information that has more than one meaning, for example, where the sending user enters a string such as "Dear Madison," the string "Madison," may return information for the city, Madison, Wis., as well as information for an individual whose name is "Madison." In such a case, erroneous information may be returned for auto fill/population, or fields where no determination may be made with confidence may be left unpopulated.

According to an aspect, a confidence score may be generated for returned information, and based on user reaction to returned information, the email template application 109 may learn from the user's interactions for improving the performance of the system on subsequent template generation and auto fill operations. For example, if the user 111 enters the word "Madison," and the system returns information for the city Madison, Wis., the returned information may receive a relatively low confidence score because of the ambiguity between the word "Madison" that may be used for a person's name and for a city. Thus, when the user reacts to the returned information, but either accepting the returned information or by changing the returned information, the user's interaction may be used by the application 109 and the detection model 110 for learning and improving its performance for subsequent template generation and auto fill operations. For example, if the user changes information associated with the city of Madison, Wis., to information associated with a person, for example, "Madison Brown," then the system may learn that on subsequent operations where the user enters the word Madison a higher likelihood and confidence may be applied to the need for information associated with the person "Madison Brown" according to this example.

Referring still to FIG. 6, if in any case, a highlighted field "XXX" or the like is left blank or unfilled, and the sending user 111 attempts to transmit the electronic message, a notification 625 may be displayed to the user 111 with a text string 630 to notify the user 111 of one or more highlighted areas that have not been completed by the user 111. If the user 111 dismisses the notification with the dismissal function 635, the user 111 may then complete the otherwise uncompleted fields before transmitting the electronic mail message to the intended recipient.

As should be appreciated, the example electronic mail messages and example content items illustrated in FIGS. 2-6 are for purposes of illustration and example only. Aspects of the disclosure described herein may similarly be used for auto generating text messages, instant messages, and the like by auto generating a template by comparing previously submitted messages, where the template may then be partially or fully auto filled by querying data sources 126, 127 with information provided by the sending user 111. That is, any messaging service whether an electronic mail application or other messaging service may use the functionalities described herein for comparing two or more emails/messages and for subsequently automatically generating messaging templates for use as described herein.

Figure 7:
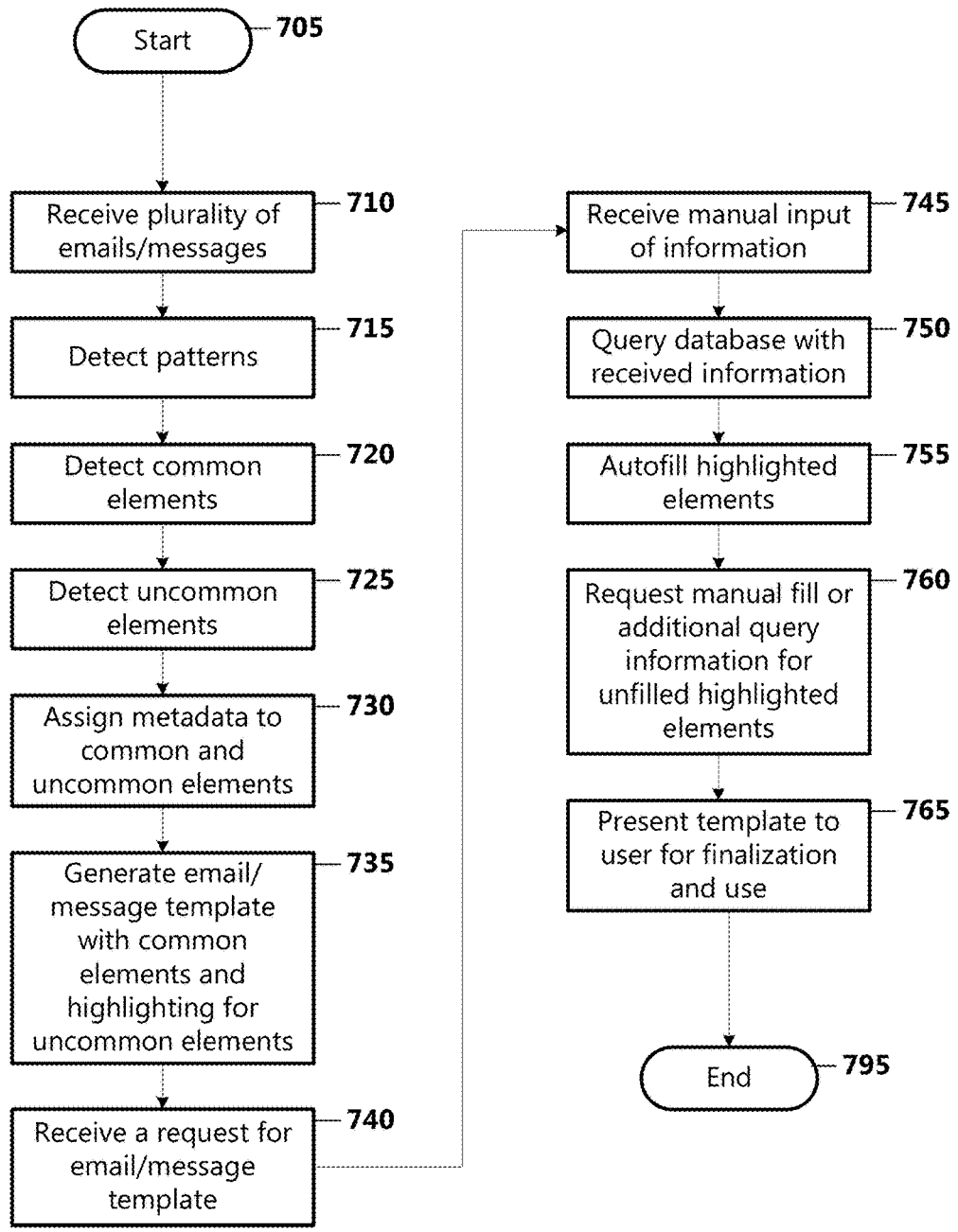
FIG. 7 is a flowchart showing general stages involved in an example method for generating an electronic email/message template and for populating highlighted data fields in the template according to aspects of the present disclosure.

Having described an operating environment and user interfaces according to the present disclosure, FIG. 7 is a flowchart showing general stages involved in an example method 700 for generating an electronic email/message template and for populating highlighted data fields in the template according to aspects of the present disclosure. For purposes of description, consider the operation of the method 700 described in FIG. 7 to be applied to electronic mail messages and content as illustrated and described with reference to FIGS. 2-6. The method 700 begins at operation 705 and proceeds to operation 710 where a plurality of emails or other electronic messages is received by the email template application 109.

At operation 715, patterns in the content of the received messages are analyzed by the detection model 110 for determining where common and uncommon elements may be contained in the received content. For example, patterns such as "Dear" followed by a name, "Hi," followed by a name, "Hello," followed by a name, and the like may be detected for purposes of determining the location of uncommon elements fields in a subsequently generated message template. As should be appreciated, using natural language processing and modeling, such patterns may be detected by passing text strings to one or more databases for returning information to indicate that certain words are common words such as "Dear," "Hello," and the like, and that strings following those common terms are uncommon terms associated with human names or entity names, that may be determined through searching one or more data sources 126, 127.

At operation 720, common elements in the content of the received emails/messages are detected by comparing the content contained in each of the received messages and by determining which content items are the same between the compared messages. At operation 725, uncommon elements are detected by first determining which elements are different between the compared emails/messages and by determining the locations of content contained in patterns associated with uncommon elements, as described with reference to operation 715.

At operation 730, metadata may be applied to both the common and uncommon elements for storing information about those elements and for subsequently generating a message template. For example, metadata may be applied to elements determined as common elements that will cause those elements to be automatically included in a subsequently generated message template, and metadata may be assigned to uncommon elements to cause the locations of those elements in subsequently generated template text to be replaced with a highlighting area, for example, "XXX" to indicate a field that needs to be manually or automatically filled with data or other information.

At operation 735, a message template 405 is automatically generated by the email template application 109, as described and illustrated above with reference to FIGS. 2-6. That is, an electronic mail or other electronic messaging template is generated where common elements are extracted from a data source 126, 127, and where any areas of the content designated as uncommon elements are populated with a highlighting field, as described above. According to one aspect, the common elements are extracted by searching on the applied metadata and highlighting notations, such as "XXX" may be placed in the textual content of the generated messaging template at appropriate locations by searching on metadata applied to the uncommon elements for determining positioning for the highlighting.

At operation 740, a request for an email/message template is received. For example, after the template is generated, the template may be stored in one or more locations, for example, a template repository accessible to the user 111 via the application 108 for use in sending an electronic mail or other electronic message. As should be appreciated, the templates may be stored on the server side in a data source 126, 127, or the templates may be stored on the client side at a client computing device 102. In either case, the application 108 may access the stored templates either through the network 120 to the data sources 126, 127 or via local memory at the computing device 102.

In response to the request for the email/message template, the requested email/message template is launched in the user's email/message user interface, as illustrated in FIG. 4. At operation 745, manual input of information is received from the sending user 111. For example, the sending user 111 may enter an electronic mail address, a text message number/address, an instant message address, or the user 111 may enter data directly into one of the uncommon elements fields 410, 415, 420, 425, 430, as illustrated in FIG. 4. At operation 750, the email template application 109 may use the received information to query the data sources 126, 127 for information associated with the received input for returning the information to auto fill the highlighted uncommon element fields present in the template 405, as illustrated in FIGS. 4 and 5. At operation 755, the returned information is automatically populated into the uncommon elements fields, as illustrated in FIG. 5.

At operation 760, if the automatically filled template still contains some unfilled areas, or if the user 111 detects some of the automatically filled data are erroneous, then the user 111 may manually populate/fill any required fields. Alternatively, if the user 111 attempts to transmit the message, and the email/message still contains unfilled areas, then the notification 625, illustrated in FIG. 6, may be automatically generated and presented to the user 111 to remind the user 111 to populate any highlighted unfilled elements.

At operation 765, the completed template may be presented to the user 111 for finalization and use. For example, if the user 111 wishes to further personalize the message, for example, where the intended recipient requires some type of special treatment or care, then the user 111 may manually edit the message before it is transmitted. The method 700 ends at operation 795 after transmission of the automatically generated and completed message template.

As described above, the sender's interaction with and use of automatically generated and completed messages, as described herein, may be used by the email template application 109 and detection model 110 for learning and for improving subsequent functionality. That is, each interaction by the user 111, for example, changing automatically populated fields, adding additional information to unpopulated fields, and the like may be analyzed by the detection model 110 for improvement of the automatic template generation and population functionality described herein.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 8:
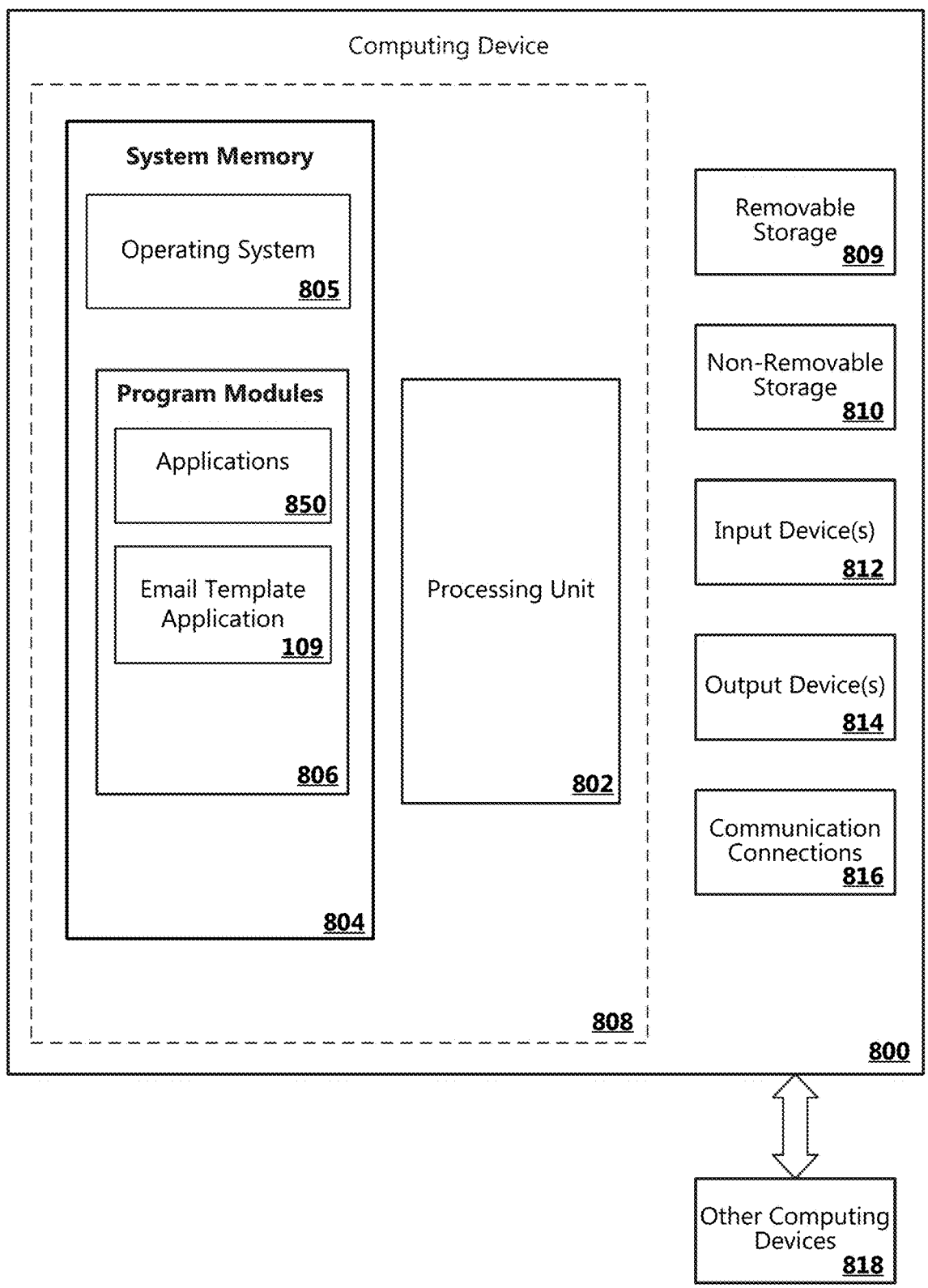
FIG. 8 is a block diagram illustrating example physical components of a computing device.
Figure 9A:
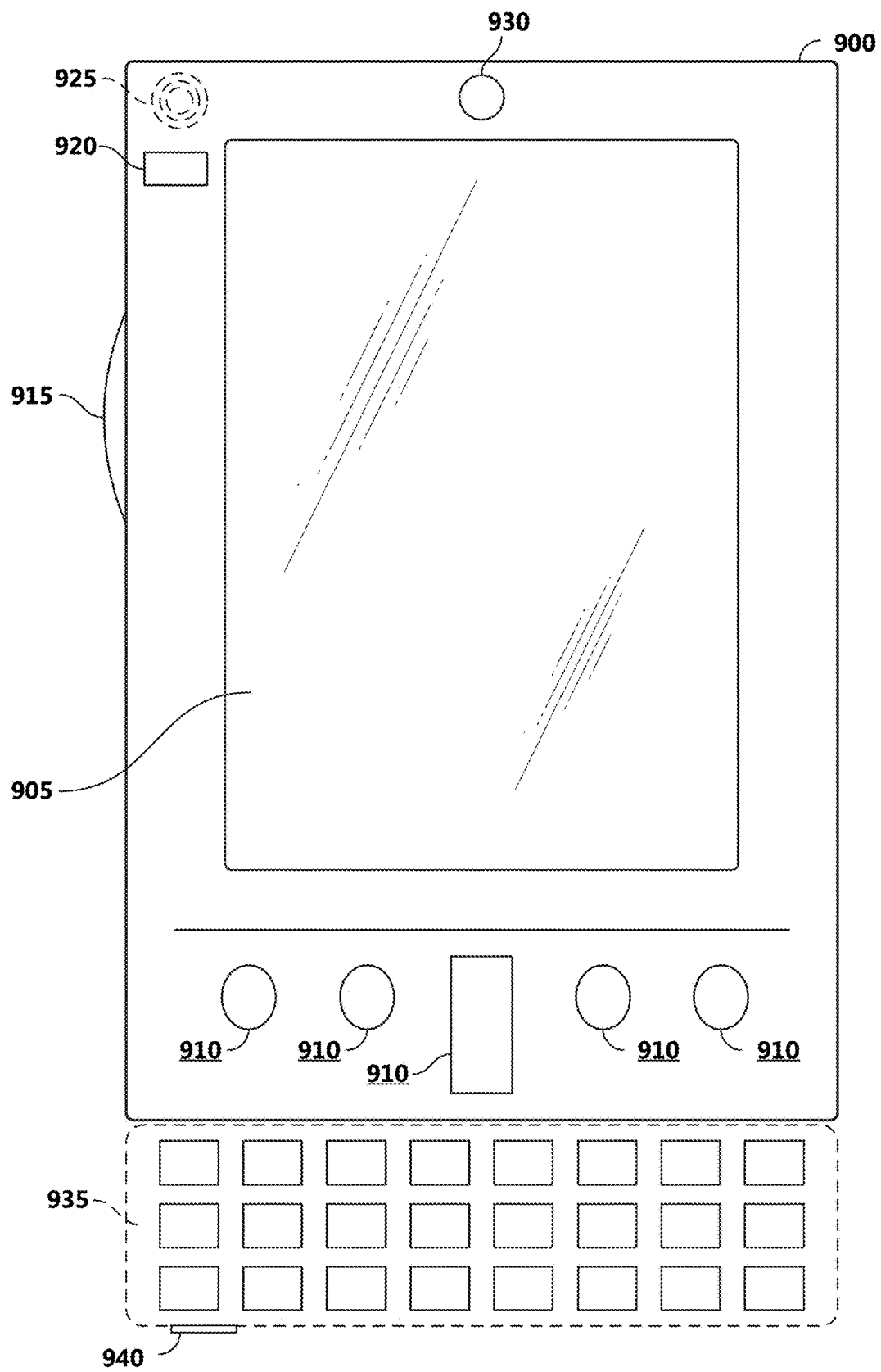
FIGS. 9*a* and 9*b* are simplified block diagrams of a mobile computing device.
Figure 9B:
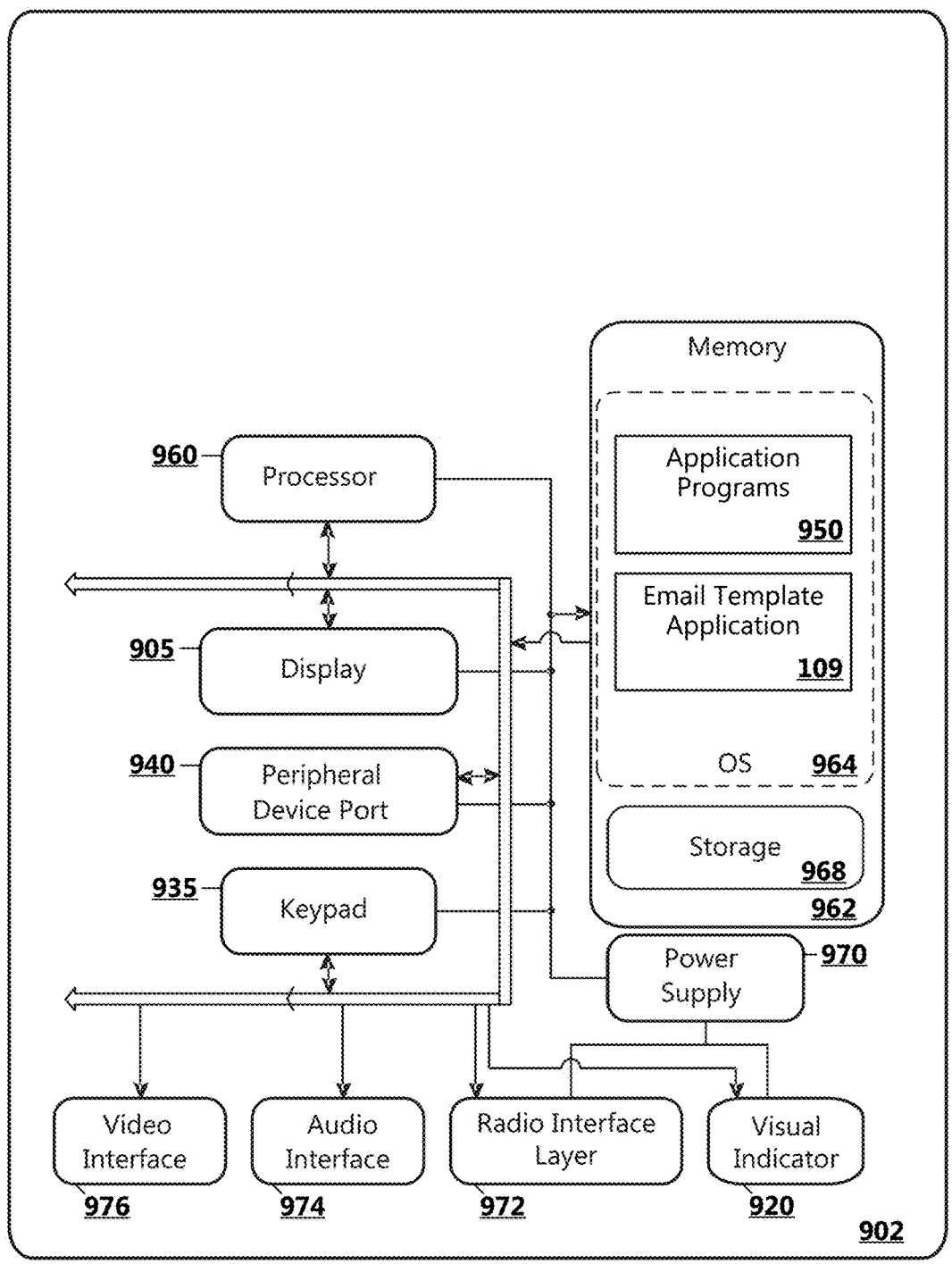
Figure 10:
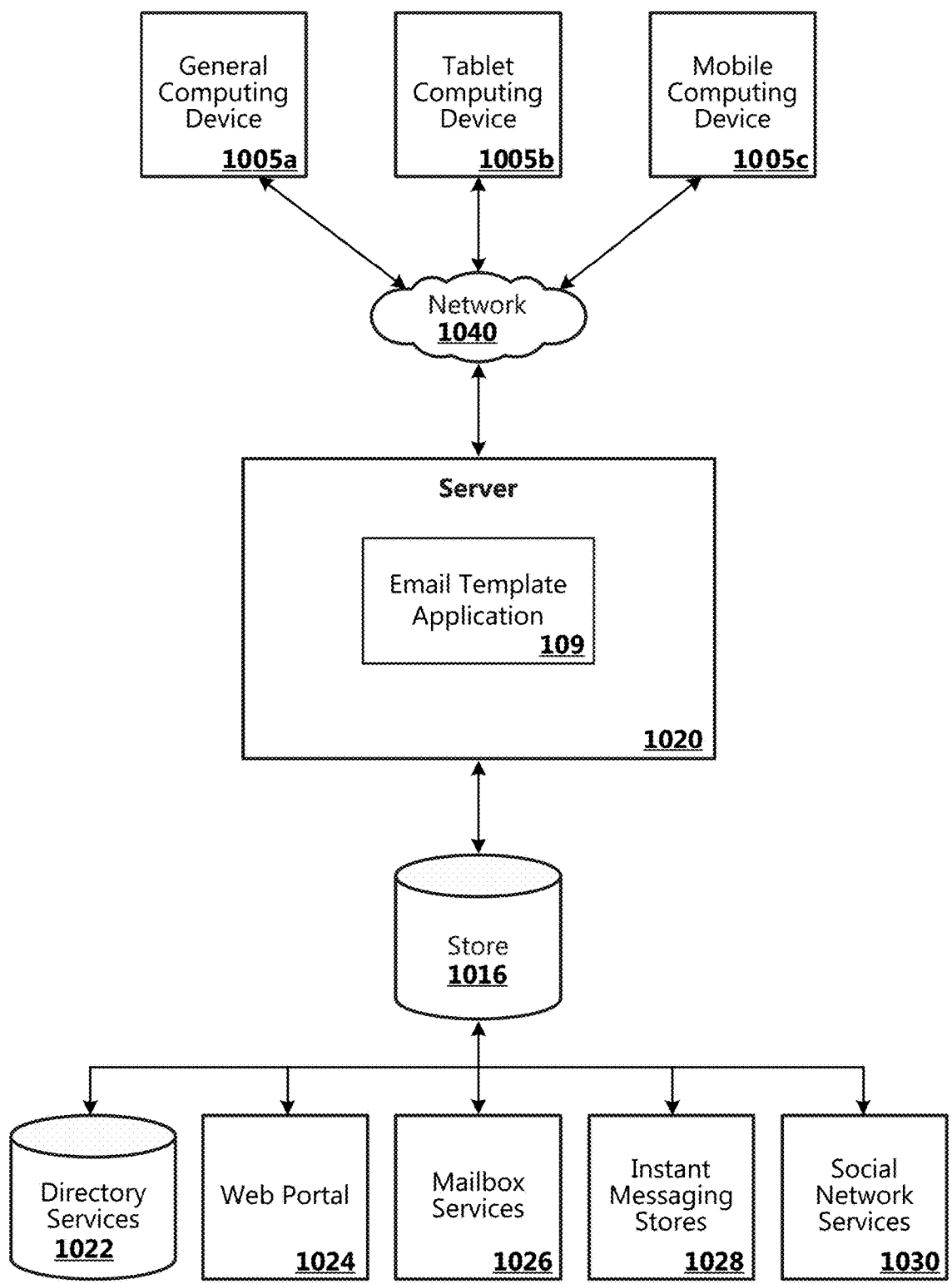
FIG. 10 is a simplified block diagram of a distributed computing system.

FIGS. 8-10 and the associated descriptions provide a discussion of a variety of operating environments in which examples are practiced. However, the devices and systems illustrated and discussed with respect to FIGS. 8-10 are for purposes of example and illustration and are not limiting of a vast number of computing device configurations that are used for practicing aspects, described herein.

FIG. 8 is a block diagram illustrating physical components (i.e., hardware) of a computing device 800 with which examples of the present disclosure may be practiced. In a basic configuration, the computing device 800 includes at least one processing unit 802 and a system memory 804. According to an aspect, depending on the configuration and type of computing device, the system memory 804 comprises, but is not limited to, volatile storage (e.g., random access memory), non-volatile storage (e.g., read-only memory), flash memory, or any combination of such memories. According to an aspect, the system memory 804 includes an operating system 805 and one or more program modules 806 suitable for running software applications 850. The operating system 805, for example, is suitable for controlling the operation of the computing device 800. Furthermore, aspects are practiced in conjunction with a graphics library, other operating systems, or any other application program, and is not limited to any particular application or system. This basic configuration is illustrated in FIG. 8 by those components within a dashed line 808. According to an aspect, the computing device 800 has additional features or functionality. For example, according to an aspect, the computing device 800 includes additional data storage devices (removable and/or non-removable) such as, for example, magnetic disks, optical disks, or tape. Such additional storage is illustrated in FIG. 8 by a removable storage device 809 and a non-removable storage device 810.

As stated above, according to an aspect, a number of program modules and data files are stored in the system memory 804. While executing on the processing unit 802, the program modules 806 (e.g., one or more components of the example system 100 (e.g., the detection model 110, the email template application 109) perform processes including, but not limited to, one or more of the stages of the method 700 illustrated in FIG. 7. According to an aspect, other program modules are used in accordance with examples and include applications such as electronic mail and contacts applications 108, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit using a microprocessor, or on a single chip containing electronic elements or microprocessors. For example, aspects are practiced via a system-on-a-chip (SOC) where each or many of the components illustrated in FIG. 8 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 800 on the single integrated circuit (chip).

According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 800 has one or more input device(s) 812 such as a keyboard, a mouse, a pen, a sound input device, a touch input device, etc. The output device(s) 814 such as a display, speakers, a printer, etc. are also included according to an aspect. The aforementioned devices are examples and others may be used. According to an aspect, the computing device 800 includes one or more communication connections 816 allowing communications with other computing devices 818. Examples of suitable communication connections 816 include, but are not limited to, radio frequency (RF) transmitter, receiver, and/or transceiver circuitry; universal serial bus (USB), parallel, and/or serial ports.

The term computer readable media as used herein include computer storage media and computer storage devices. Computer storage media and computer storage devices include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. According to an aspect, any such computer storage media is part of the computing device 800. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 9A and 9B illustrate a mobile computing device 900, for example, a mobile telephone, a smart phone, a tablet personal computer, a laptop computer, and the like, with which aspects may be practiced. With reference to FIG. 9A, an example of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. According to an aspect, the display 905 of the mobile computing device 900 functions as an input device (e.g., a touch screen display). If included, an optional side input element 915 allows further user input. According to an aspect, the side input element 915 is a rotary switch, a button, or any other type of manual input element. In alternative examples, mobile computing device 900 incorporates more or less input elements. For example, the display 905 may not be a touch screen in some examples. In alternative examples, the mobile computing device 900 is a portable phone system, such as a cellular phone. According to an aspect, the mobile computing device 900 includes an optional keypad 935. According to an aspect, the optional keypad 935 is a physical keypad. According to another aspect, the optional keypad 935 is a "soft" keypad generated on the touch screen display. In various aspects, the output elements include the display 905 for showing a graphical user interface (GUI), a visual indicator 920 (e.g., a light emitting diode), and/or an audio transducer 925 (e.g., a speaker). In some examples, the mobile computing device 900 incorporates a vibration transducer for providing the user with tactile feedback. In yet another example, the mobile computing device 900 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 900 incorporates peripheral device port 940, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one example of a mobile computing device. That is, the mobile computing device 900 incorporates a system (i.e., an architecture) 902 to implement some examples. In one example, the system 902 is implemented as a "smart phone" capable of running one or more applications (e.g., browser, e-mail, calendaring, contact managers, messaging clients, games, and media clients/players). In some examples, the system 902 is integrated as a computing device, such as an integrated personal digital assistant (PDA) and wireless phone.

According to an aspect, one or more application programs 950 are loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. According to an aspect, one or more components of the example system 902 (e.g., the detection model 110 and the email template application 109) are loaded into memory 962. The system 902 also includes a non-volatile storage area 968 within the memory 962. The non-volatile storage area 968 is used to store persistent information that should not be lost if the system 902 is powered down. The application programs 950 may use and store information in the non-volatile storage area 968, such as email or other messages used by an email application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900.

According to an aspect, the system 902 has a power supply 970, which is implemented as one or more batteries. According to an aspect, the power supply 970 further includes an external power source, such as an AC adapter or a powered docking cradle that supplements or recharges the batteries.

According to an aspect, the system 902 includes a radio 972 that performs the function of transmitting and receiving radio frequency communications. The radio 972 facilitates wireless connectivity between the system 902 and the "outside world," via a communications carrier or service provider. Transmissions to and from the radio 972 are conducted under control of the operating system 964. In other words, communications received by the radio 972 may be disseminated to the application programs 950 via the operating system 964, and vice versa.

According to an aspect, the visual indicator 920 is used to provide visual notifications and/or an audio interface 974 is used for producing audible notifications via the audio transducer 925. In the illustrated example, the visual indicator 920 is a light emitting diode (LED) and the audio transducer 925 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. According to an aspect, the system 902 further includes a video interface 976 that enables an operation of an on-board camera 930 to record still images, video stream, and the like.

According to an aspect, a mobile computing device 900 implementing the system 902 has additional features or functionality. For example, the mobile computing device 900 includes additional data storage devices (removable and/or non-removable) such as, magnetic disks, optical disks, or tape. Such additional storage is illustrated in FIG. 9B by the non-volatile storage area 968.

According to an aspect, data/information generated or captured by the mobile computing device 900 and stored via the system 902 is stored locally on the mobile computing device 900, as described above. According to another aspect, the data is stored on any number of storage media that is accessible by the device via the radio 972 or via a wired connection between the mobile computing device 900 and a separate computing device associated with the mobile computing device 900, for example, a server computer in a distributed computing network, such as the Internet. As should be appreciated such data/information is accessible via the mobile computing device 900 via the radio 972 or via a distributed computing network. Similarly, according to an aspect, such data/information is readily transferred between computing devices for storage and use according to well-known data/information transfer and storage means, including electronic mail and collaborative data/information sharing systems.

FIG. 10 is a simplified block diagram of a distributed computing system for providing automatic generation and population of electronic messaging templates, as described above. Content developed, interacted with, or edited in association with the one or more components of the example system 1000 is enabled to be stored in different communication channels or other storage types. For example, various documents may be stored using a directory service 1022, a web portal 1024, a mailbox service 1026, an instant messaging store 1028, or a social networking site 1030. One or more components of the example system 1000 are operative to use any of these types of systems or the like for providing automatic generation of electronic messaging templates, as described herein. According to an aspect, a server 1020 provides the one or more components of the example system 1000 to clients 1005*a,b,c*. As one example, the server 1020 is a web server providing one or more components of the example system 1000 over the web. The server 1020 provides one or more components of the example system 1000 over the web to clients 1005 through a network 1040. By way of example, the client computing device is implemented and embodied in a personal computer 1005*a*, a tablet computing device 1005*b* or a mobile computing device 1005*c* (e.g., a smart phone), or other computing device. Any of these examples of the client computing device are operable to obtain content from the store 1016.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A method of automatically generating an electronic messaging template, comprising:
   receiving a plurality of electronic messages;
   comparing each of the plurality of electronic messages to determine whether elements are contained in each of the electronic messages that are the same as elements contained in other of the electronic messages and to determine whether elements are contained in each of the electronic messages that are different from elements contained in the other of the electronic messages, wherein the elements determined to be the same are considered common elements, and wherein the elements determined to be different are considered uncommon elements, the uncommon elements including data values that are specific to recipients of the plurality of electronic messages and stored in a data source;
   automatically generating an electronic messaging template containing textual content comprising the common elements and a highlighted field corresponding to each of the uncommon elements, wherein the common elements are extracted from the plurality of electronic messages and wherein the uncommon elements are populated with the highlighted field;
   in response to receiving a request for the electronic messaging template to use in generating an electronic message and identifiable information associated with a recipient of the electronic message:
      querying the data source using the identifiable information associated with the recipient to retrieve data values specific to the recipient that correspond to each highlighted field; and
      automatically filling each highlighted field in the electronic messaging template with the corresponding data values retrieved from the data source;
   generating a confidence score for the corresponding data values retrieved from the data source with which each highlighted field is automatically filled;
   receiving a reaction of a sender of the electronic message to one or more of the automatically filled highlighted fields, wherein the reaction is accept or change; and
   based on the reaction, adjusting the confidence score.

2. The method of claim 1, wherein comparing each of the plurality of electronic messages includes determining one or more patterns in textual content contained in each of the plurality of electronic messages for determining that one or more of the common elements and one or more of the uncommon elements are contained in each of the plurality of electronic messages as compared to each of the other of the plurality of electronic messages.

3. The method of claim 1, further comprising annotating each of the common elements with metadata associating the common elements with an electronic message of a given type.

4. The method of claim 3, further comprising annotating each of the uncommon elements with metadata associating the uncommon elements with the electronic message of the given type.

5. The method of claim 4, wherein automatically generating the electronic messaging template includes searching for the common elements based on the metadata associated with each of the common elements and searching for the uncommon elements based on the metadata associated with each of the uncommon elements.

6. The method of claim 5, further comprising associating metadata applied to each of the uncommon elements with the corresponding data values stored in the data source.

7. The method of claim 1, wherein each of the plurality of electronic messages include one or more of:
   electronic mail messages;
   text messages; and
   instant messages.

8. The method of claim 1, further comprising presenting in a graphical user interface the electronic messaging template.

9. The method of claim 1, wherein receiving the request for the electronic messaging template includes receiving a selection of the electronic messaging template from a store of electronic messaging templates.

10. The method of claim 1, further comprising receiving a manual input of an information item into the electronic messaging template, the information item including the identifiable information associated with the recipient of the electronic message.

11. The method of claim 10, wherein the information item includes one or more of:
   an electronic mail address;
   a text messaging address;
   an instant messaging address; and one or more data values manually filled into one or more of the highlighted fields in the electronic messaging template.

12. The method of claim 10, wherein querying the data source includes querying a data profile associated with the recipient.

13. The method of claim 10, after automatically filling each highlighted field with the corresponding data values retrieved from the data source, receiving a manual filling of any highlighted fields in the electronic messaging template that remain unfilled.

14. The method of claim 1, prior to allowing transmission of the electronic message generated using the electronic messaging template to the recipient, notifying the sender of the electronic message of any highlighted fields in the electronic messaging template that have not been filled.

15. The method of claim 1, wherein the uncommon elements include data values for a name, an invoice number, and an invoice due date that are specific to the recipients of the plurality of electronic messages, and in response to receiving the request for the electronic messaging template to use in generating the electronic message and the identifiable information associated with the recipient of the electronic message:
  querying the data source using the identifiable information associated with the recipient to retrieve data values for the name, the invoice number, and the invoice due date specific to the recipient that correspond to each highlighted field; and
  automatically filling each highlighted field in the electronic messaging template with the corresponding data values retrieved from the data source.

16. A system for providing automatic generation of an electronic messaging template, the system comprising:
  at least one processing unit; and
  at least one computer readable data storage device comprising nonvolatile media storing instructions that, when executed by the at least one processing unit, cause the processing unit to:
    receive a plurality of electronic messages;
    compare each of the plurality of electronic messages to determine whether elements are contained in each of the electronic messages that are the same as elements contained in other of the electronic messages and to determine whether elements are contained in each of the electronic messages that are different from elements contained in the other of the electronic messages, wherein the elements determined to be the same are considered common elements, and wherein the elements determined to be different are considered uncommon elements, the uncommon elements including data values that are specific to recipients of the plurality of electronic messages and stored in a data source that is external to and accessible by the system;
    automatically generate an electronic messaging template containing textual content comprising the common elements and a highlighted field corresponding to each of the uncommon elements, wherein the common elements are extracted from the plurality of electronic messages, and wherein the uncommon elements are populated with the highlighted field;
    present in a graphical user interface the electronic messaging template;
    in response to receiving a request for the electronic messaging template to use in generating an electronic message and identifiable information associated with a recipient of the electronic message:
      query the data source using the identifiable information associated with the recipient to retrieve data values specific to the recipient that correspond to each highlighted field; and
      automatically fill each highlighted field in the electronic messaging template with the corresponding data values retrieved from the data source;
    generate a confidence score for the corresponding data values retrieved from the data source with which each highlighted field is automatically filled;
    receive a reaction of a sender of the electronic message to one or more of the automatically filled highlighted fields, wherein the reaction is accept or change; and
    based on the reaction, adjust the confidence score.

17. The system of claim 16, wherein the data source is an enterprise database.

18. The system of claim 16, wherein the data source is a third party application data source.

19. The system of claim 16, wherein the identifiable information associated with the recipient includes one or more of:
  an electronic mail address;
  a text messaging address;
  an instant messaging address; and
  one or more data values manually filled into one or more of the highlighted fields in the electronic messaging template that identify the recipient.

20. A computer readable storage device comprising nonvolatile media including computer readable instructions, which when executed by a processing unit is operative to perform a method of automatically generating an electronic messaging template, comprising:
  receiving a plurality of electronic messages;
  comparing each of the plurality of electronic messages to determine whether elements are contained in each of the electronic messages that are the same as elements contained in other of the electronic messages and to determine whether elements are contained in each of the electronic messages that are different from elements contained in the other of the electronic messages, wherein the elements determined to be the same are considered common elements, and wherein the elements determined to be different are considered uncommon elements, the uncommon elements including data values that are specific to recipients of the plurality of electronic messages and stored in a data source;
  automatically generating an electronic messaging template containing textual content comprising the common elements and a highlighted field corresponding to each of the uncommon elements, wherein the common elements are extracted from the plurality of electronic messages, and wherein the uncommon elements are populated with the highlighted field;
  receiving a request for the electronic messaging template to use in generating an electronic message;
  receiving a manual input of an information item into the electronic messaging template, the information item including identifiable information associated with a recipient of the electronic message;
  in response to receiving the request and the identifiable information:
    querying the data source using the identifiable information associated with the recipient to retrieve data values specific to the recipient that correspond to each highlighted field; and automatically filling each highlighted field in the electronic messaging template with the corresponding data values retrieved from the data source;
generating a confidence score for the corresponding data values retrieved from the data source with which each highlighted field is automatically filled;
receiving a reaction of a sender of the electronic message to one or more of the automatically filled highlighted fields, wherein the reaction is accept or change; and
based on the reaction, adjusting the confidence score.

* * * * *